Jan. 27, 1931. M. I. MATHEWSON 1,790,550
GRINDING MACHINE
Filed July 19, 1927 9 Sheets-Sheet 1

Fig.1

Jan. 27, 1931. M. I. MATHEWSON 1,790,550
GRINDING MACHINE
Filed July 19, 1927 9 Sheets-Sheet 2

Jan. 27, 1931.   M. I. MATHEWSON   1,790,550
GRINDING MACHINE
Filed July 19, 1927   9 Sheets-Sheet 6

Jan. 27, 1931. M. I. MATHEWSON 1,790,550
GRINDING MACHINE
Filed July 19, 1927 9 Sheets-Sheet 8

Witness
Jas. J. Maloney

Inventor
Maxwell I. Mathewson
By his Attys

Patented Jan. 27, 1931

1,790,550

UNITED STATES PATENT OFFICE

MAXWELL I. MATHEWSON, OF PROVIDENCE, RHODE ISLAND, ASSIGNOR TO BROWN AND SHARPE MANUFACTURING COMPANY, A CORPORATION OF RHODE ISLAND

GRINDING MACHINE

Application filed July 19, 1927. Serial No. 206,917.

The invention relates to grinding machines and more particularly to that type of machine in which the grinding wheel is mounted on a carriage to move toward and away from the work and the work is mounted on a work supporting table to move back and forth longitudinally of the grinding wheel spindle.

The objects of the invention are to reorganize and improve the construction and operation of the several cooperating elements of a grinding machine to secure a smoother and more efficient operation of the machine, to eliminate all unnecessary shock or jar in starting and stopping the work supporting carriage, to increase the speed at which machines of this type may be operated, to extend still further the automatic operation of the several cooperating elements, and finally to secure a more adequate control of these elements by the operator.

With these objects in view, the invention consists in the devices, combinations, and arrangement of parts hereinafter described and claimed.

The several features of the invention and the advantages to be obtained thereby will be readily understood by those skilled in the art from the following description taken in connection with the accompanying drawings, in which.

Figure 1:
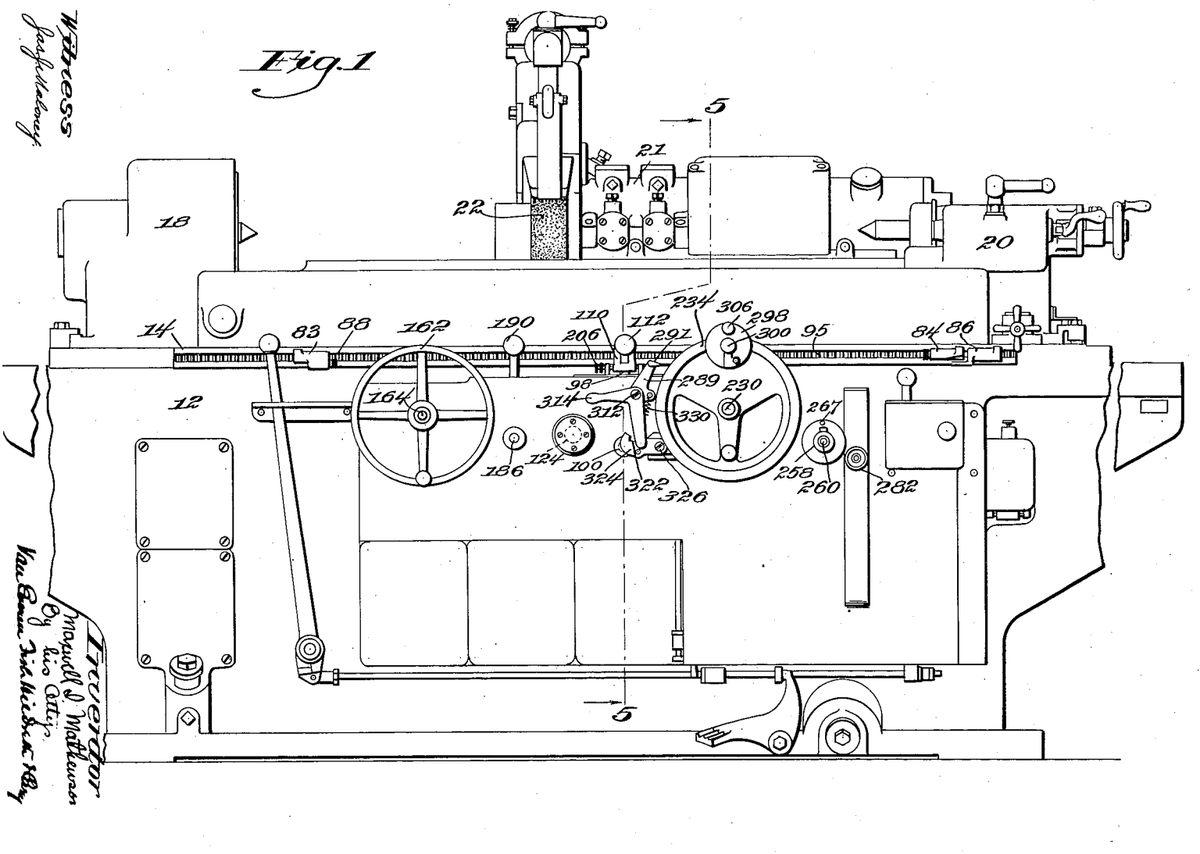
Fig. 1 is a view in front elevation of a grinding machine embodying the present invention.

Referring to the drawings, the machine illustrated comprises a frame 12 on the front portion of which is mounted a work supporting table 14 which is adapted for transverse movement on ways 16 and is provided with a headstock 18 and a footstock 20. A rotary grinding wheel is indicated at 22 secured to a wheel spindle 24 on the wheel spindle carriage 21 which is mounted on ways 28 on the rear portion of the frame to slide towards and away from the work. A water trough 29 is formed in the machine frame between the work support and the wheel spindle carriage to drain off the water which is continuously poured over the work during the grinding operation.

A power drive is provided for the table 14 including change speed and reversing mechanism which is adapted to drive the table at a number of different speeds. In order to insure that the work is ground evenly throughout its length, it is necessary to feed the table at a nearly constant speed to the end of its travel when it is abruptly stopped and abruptly started on its return travel. The difficulties encountered in overcoming the inertia of the heavy table and the intervening driving mechanism without subjecting the parts to excessive shock or jar have in the past seriously limited the speed at which the table could be safely operated. With the construction and arrangement of the parts herein disclosed, these difficulties have been so far overcome as to permit a much higher speed of operation than heretofore feasible without undue shock or strain on the mechanism.

Figure 2:
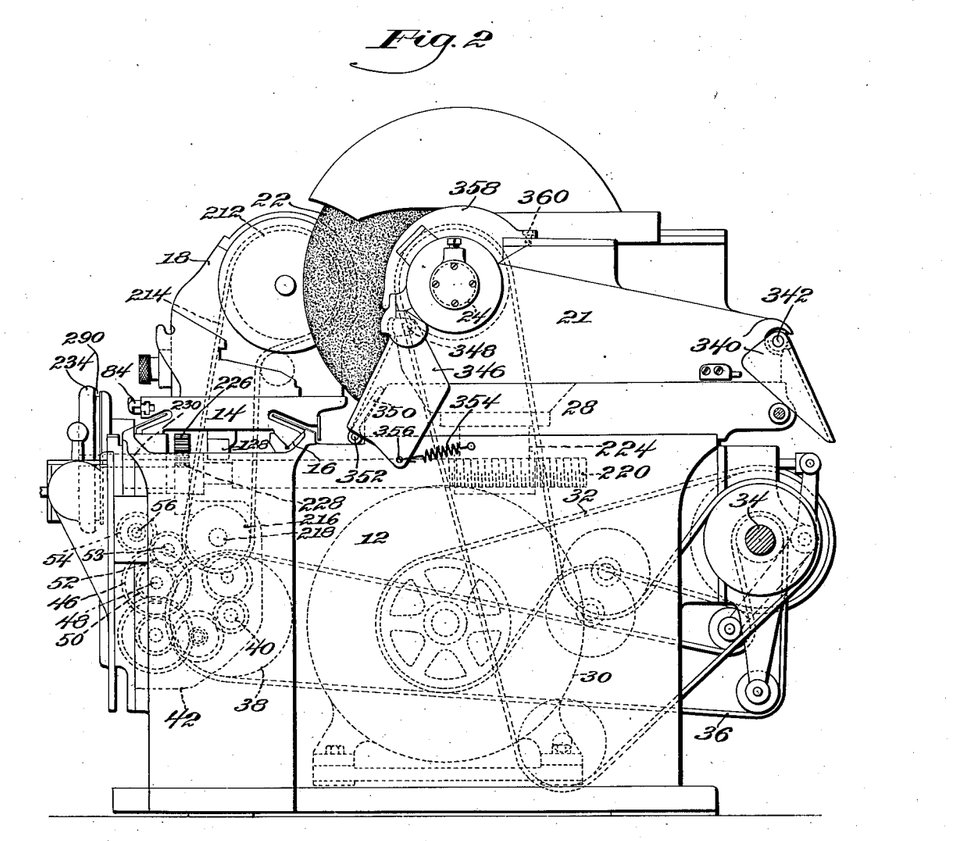
Fig. 2 is a view in right side elevation illustrating particularly the motor and connections for driving the machine.

Movement is transmitted from some source of power such as the motor indicated in dotted lines at 30 through a belt 32 onto a driving shaft 34 and by means of a belt 36 from the driving shaft 34 to a pulley 38 which is mounted on a shaft 40 connected with the change speed gearing and the reversing mechanism for the table drive and the headstock drive in the gear box 42.

In connection with the mechanism for reversing the table, new and improved means are provided for securing a dwell at the end of the travel of the table in each direction and for cushioning the shock to which the parts are subjected in bringing the table suddenly up to speed due to the inertia and friction of the table and the intermediate driving mechanism. Means are also provided for adjusting the amount of the dwell in accordance with the requirements of the particular work being operated upon. If so desired, the dwell can be entirely eliminated so that the table is stopped and started immediately in the opposite direction.

Figure 3:
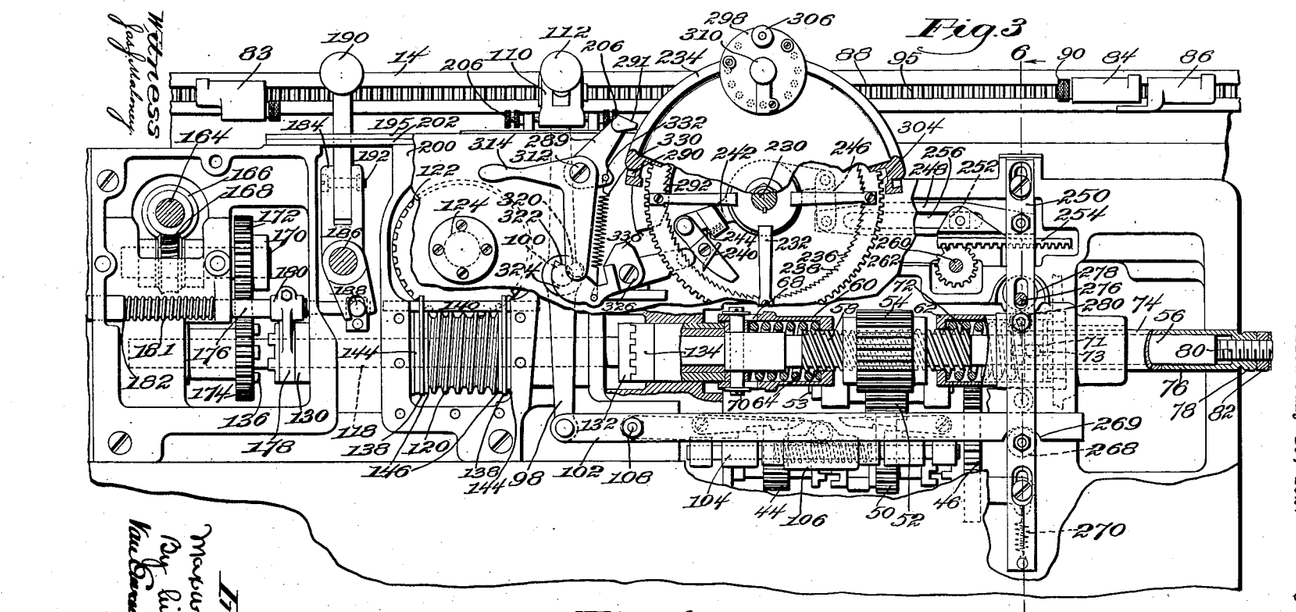
Fig. 3 is a view in front elevation of a portion of the machine with parts broken away illustrating particularly the table drive and reversing mechanism.
Figure 4:
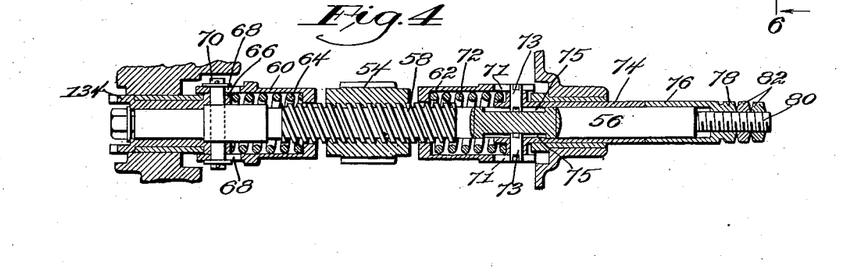
Fig. 4 is a detail sectional view of the table reversing and dwell mechanism.
Figure 5:
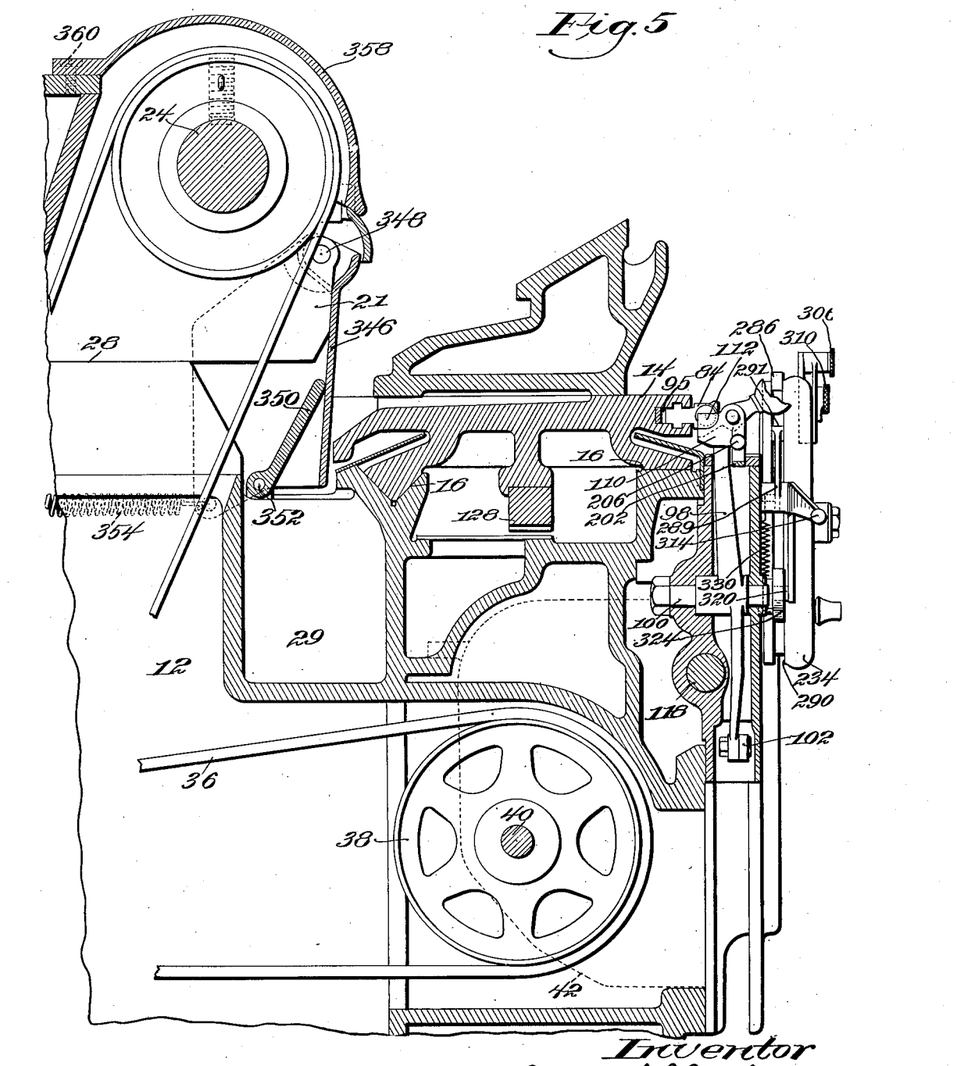
Fig. 5 is a sectional view in left elevation taken on the line 5—5 of Fig. 1.
Figure 6:
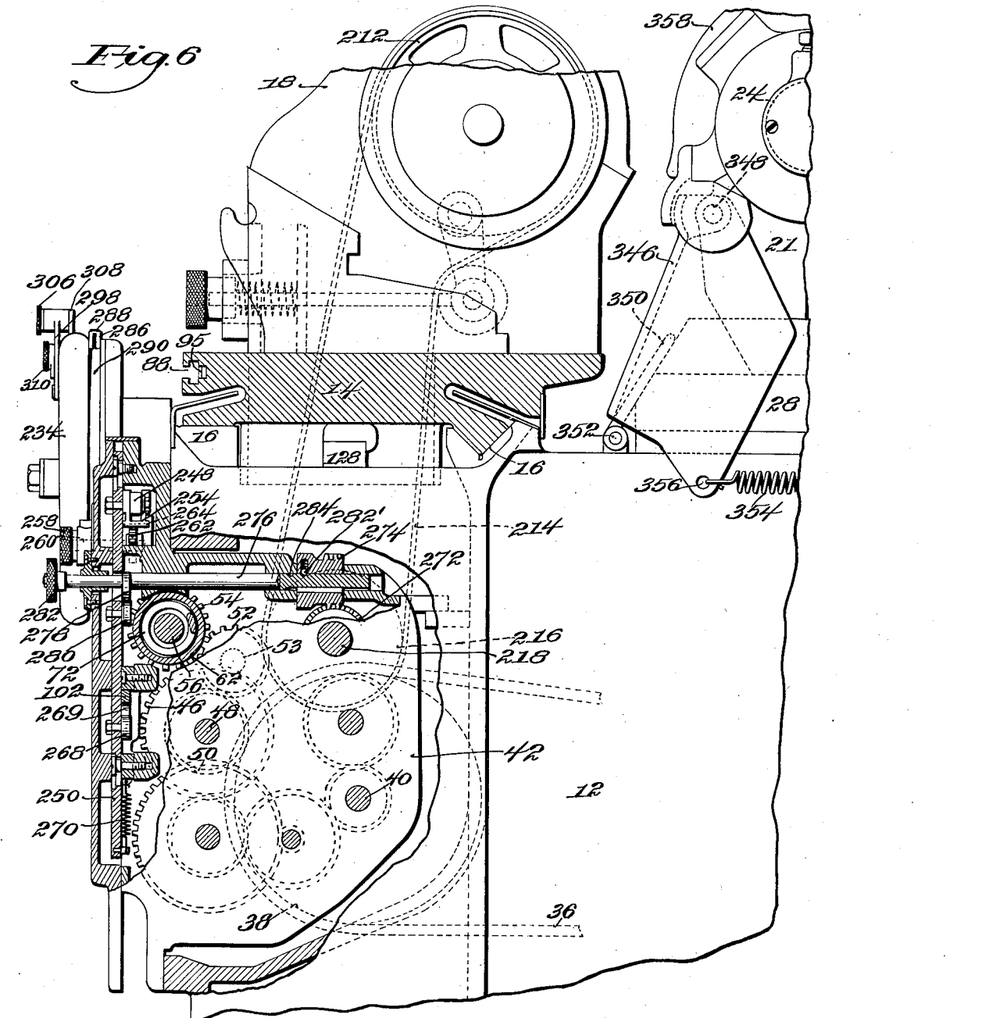
Fig. 6 is a view in right elevation partly in section taken on the line 6—6 of Fig. 3.

The reversing mechanism comprises the gears 44 and 46 loosely mounted on the shaft 48 and driven in opposite directions by the change speed mechanism from the shaft 40. A gear clutch member 50 is loosely mounted on the shaft 48 between the gears 44 and 46 to engage with one or the other of them and meshes with an idler gear 52 mounted on a shaft 53. The gear 52 in turn meshes with a gear 54 which is mounted on the driving shaft 56 for the table power feed.

In order to provide a dwell at the end of the travel of the table in each direction, the gear 54 is internally threaded to engage with a screw thread 58 on the driving shaft 56 so that when the direction of rotation of the gear 54 is reversed the screw connection 58 will cause the gear 54 to move along the shaft 56 to the end of its travel before it is locked to turn the shaft. The amount of the dwell relatively to the speed at which the table is being driven will then depend on the length of travel of the gear 54 along the driving shaft 56.

Cushioning devices comprising the spring pressed sleeve plungers 60 and 62 surrounding the driving shaft 56 are provided to take up the shock of starting the table when the gear 54 reaches the end of its travel on the screw 58 and is locked to turn with the driving shaft 56. The sleeve plunger 60 is forced yieldingly towards the nut gear 54 by means of a compression spring 64 surrounding the driving shaft 56 within the sleeve and abutting a shoulder of a sleeve 66 secured on the shaft 56 by means of a pin 70. Slots 68 are formed in the sleeve to engage with the pin 70 and key the sleeve to turn with the driving shaft. The sleeve plunger 62 is similarly mounted at the opposite end of the screw thread 58 and is forced yieldingly towards the nut gear 54 by means of a compression spring 72 coiled about the shaft 56 within the sleeve and abutting a shoulder formed on the sleeve 74. Two radially disposed pins 73 secured in the sleeve 74 which engage at their outer ends in slots 71 in the sleeve plunger 62 and at their inner ends in grooves 75 in the shaft 56, key the sleeve plunger 62 to turn with the shaft 56. With this construction, starting from the position illustrated in Fig. 3, with the gear 54 in the central position, the gear 54 will move along the shaft 56 until it comes in contact with the spring plunger 60 or 62. As the plunger is moved back by the gear 54, the resisting pressure of the spring will tend to increase the frictional contact between the gear 54 and the screw threaded shaft 56 causing the shaft to turn at an increasing rate until the spring is compressed to its limit when the gear will be locked with relation to the shaft.

In order to provide a convenient means for adjusting the amount of the dwell at the end of the travel of the table, the sleeve 74 against which the spring plunger 62 is seated abuts at its outer end against a sleeve 76 which surrounds the driving shaft and has a nut 78 formed on its outer end which engages a screw threaded portion 80 of the shaft. As the nut and the sleeve are turned up on the screw thread, the sleeve 74 and consequently the spring plunger 62, will be moved in a direction to decrease the amount of the travel of the gear 54 along the shaft, thus decreasing the dwell at the end of the table travel. The sleeve 76 is held adjustably in position by means of lock nuts 82.

Figure 8:
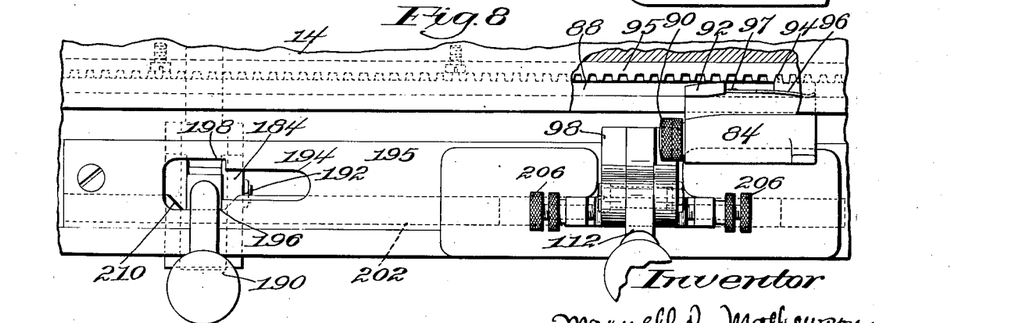
Fig. 8 is a detail plan view of the control levers for operating the table reversing mechanism and for stopping the machine at the end of table travel in either direction.
Figure 10:
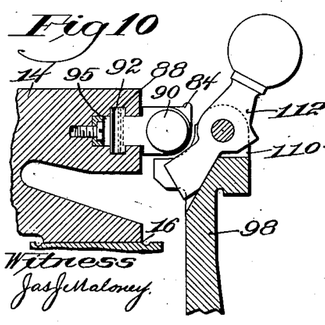
Fig. 10 is a detailed section view of the control lever for the table reversing mechanism.
Figure 11:
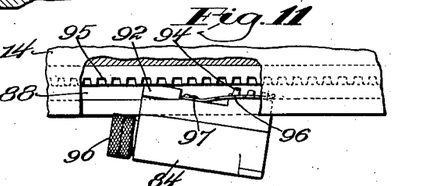
Fig. 11 is a detail plan view of the reversing dogs for the table drive.

The mechanism for reversing the table is automatically operated at predetermined points in the travel of the table in each direction by adjustable dogs carried on the table which cooperate with a reversing lever mounted on the stationary frame. The dogs indicated at 83, 84 and 86 are mounted in a T-shaped slot 88 on the table and are constructed and arranged so that they may be readily moved along by the operator and at the same time are self-locking in position. As illustrated in Figs. 8, 10 and 11, adjacent to the contact point 90 each dog is provided with a cross bar 92 extending into the undercut portions of the slot 88 and at the opposite end with a gear toothed segment 94 which is adapted to engage with a corresponding rack 95 formed in the bottom of the T-slot 88. A small spring 96 fastened at 97 to the under side of the dog and bearing against the shoulders formed by the undercut portions of the slot tends to hold the gear segment 94 in mesh with the rack 95. With this construction, the dog is self-locking in position since any pressure against the contact point will tend to swing the dog about the cross bar 92 and cause the gear segment 94 to mesh firmly with the rack 95. The dog may be readily moved by the operator to adjust the table travel by lifting the rear end of the dog to disengage the gear teeth and the rack as illustrated in Fig. 11.

The reversing lever which cooperates with the dogs is indicated at 98 pivotally mounted at 100 on the machine frame. It is connected at its lower end to the sliding bar 102 and the load and fire mechanism which is generally indicated at 104 for actuating the reversing clutch. The load and fire mechanism is actuated from the reversing lever by means of a yoke 106 which is pivotally connected at 108 to the sliding bar 102. For a detailed description of the load and fire mechanism, reference may be had to the patent to H. E. Townsend, No. 1,129,762, dated February 23, 1915. The upper end of the reversing lever 98 comprises a block 110 which is adapted to come in contact with the dogs 83 and 86 and is slotted to receive a small detent lever 112 which may be positioned to come in contact with or to avoid the dog 84 as desired. Ordinarily, during the operation of the machine, the table will be reciprocating between limits marked by the dogs 83 and 84 on the table. However, if it is desired to true up the grinding wheel, a truing tool is mounted on the footstock and the detent lever 112 set to permit the table to continue its travel to the left until the reversing lever encounters the dog 86 thus causing the truing tool to be passed across the face of the grinding wheel and back again.

Figure 7:
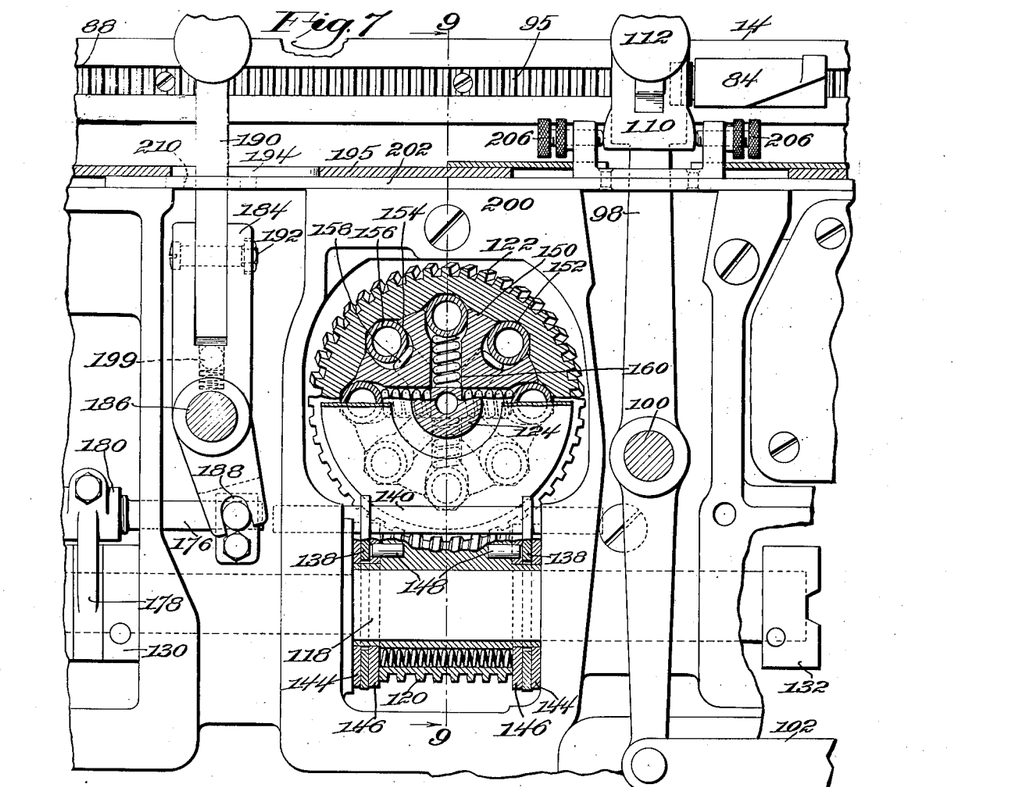
Fig. 7 is a detail view in front elevation of the worm drive for the table.

The connections for driving the table by power either from the driving shaft 56 or by hand comprise a clutch shaft 118 on which is splined a worm gear 120 which in turn meshes with a gear 122 connected to the cross shaft 124. The table is driven directly from the cross shaft 124 by a gear 126 which engages with a rack 128 formed on the under side of the table. The clutch shaft 118 is provided with the clutch members 130 and 132 respectively and is movable in one direction to engage a corresponding clutch member 134 formed on an abutting end of the driving shaft 56 for the power feed and is movable in the opposite direction to engage with the clutch member 136 for the hand feed.

The worm gear 120 and the gear 122 through which the table is driven, form a substantially irreversible drive. Consequently, when the shaft 118 and the worm gear 120 stop at the end of the table drive, the table is brought to an abrupt halt. In order, however, to overcome any inertia in the mechanism for driving the worm when the power is thrown off from the clutch shaft 118 and any movement of the worm gear due to the inertia of the table, a friction or drag device is provided which tends to bring the gear 120 and the shaft to an immediate stop.

For this purpose, two stationary friction disks 138 are provided, one at each end of the worm gear 120 surrounding the clutch shaft 118 and hung from a spindle 140 in a stationary part of the machine frame. These disks are further secured against rotation by the contact of their lower portion indicated at 142, Fig. 9, with the machine frame. These friction disks are abutted on one side by the disks 144 mounted to turn loosely on the hubs of the worm gear 120 and on the other side by the disks 146 mounted on the hub of the worm gear 120 and keyed to turn therewith by means of the plungers 148 mounted in recesses in the worm gear. The required friction between the moving and stationary members of the friction device is secured by means of compression springs which are mounted in cylindrical holes extending through the worm gear 120 and which bear at each end against the friction disks 146. This frictional drag also prevents any undesirable movement of the table when the power drive is disconnected.

When the clutch shaft 118 is stopped at any point in the table travel by the reversal or stopping of the driving mechanism, the heavy table is brought to an abrupt halt by the locking action of the worm 120 and worm gear 122 so that the worm, worm wheel and mechanism immediate the worm gear and table receive the full brunt of the shock. The present invention contemplates the provision of means for adequately taking up the shock upon the parts due to both stopping and starting the work table which will permit the machine to operate smoothly and efficiently at higher speeds than have heretofore been feasible in machines of this type without sacrificing the accuracy which is essential for good work.

Figure 9:
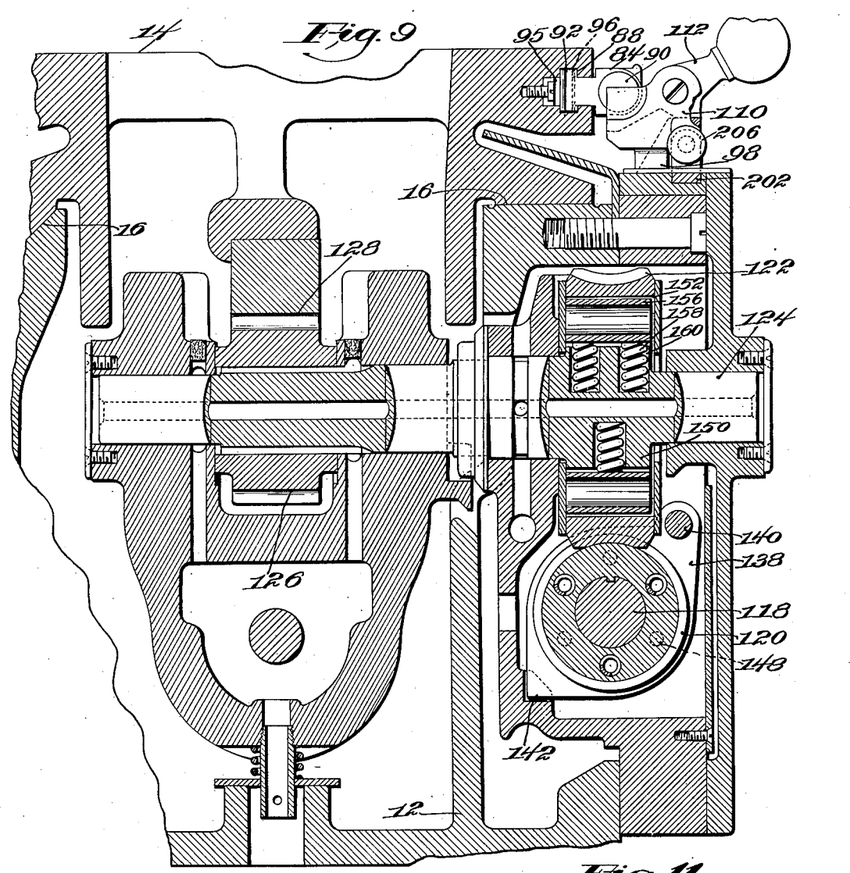
Fig. 9 is a sectional view in left elevation taken on the line 9—9 of Fig. 7.

The shock of the sudden starting and stopping of the table is taken up by means of a yielding connection or shock absorber between the gear 122 and the cross shaft 124 from which the table is driven. The gear 122 is loosely mounted to turn on an enlarged hub or annular disk 150 on the cross shaft 124 and is provided on its inner periphery with a series of V-shaped slots 152 which register with a series of smaller grooves 154 formed on the outer periphery of the hub 150. A series of rollers 156 are mounted in the grooves and are pressed yieldingly outwards into the slots by the compression springs 158 mounted in radially disposed recesses 160 on the hub 150. The pressure of the springs is sufficient during the continuous operation of the table drive to hold the rollers 156 centered in the V-shaped slots 152 to maintain the gear 122 fixed with relation to its hub 150. However, under the greater strain of starting and stopping the table, the rollers will be forced in by the V-shaped walls of the slots 152 permitting the gear 122 to give slightly with relation to its hub 150 after which the parts will return again to their normal position under the pressure of the springs 158.

The hand feed for the work table comprises a hand wheel 162, mounted on a shaft 164 to which is secured the worm 166 meshing with the worm gear 168 on a shaft 170. The shaft 170 in turn carries a gear 172 which meshes with a gear 174 which is loosely mounted on the clutch shaft 118 and has formed on the face thereof the clutch member 136 previously referred to, to engage the corresponding clutch member 130 on the clutch shaft for driving the table.

Hand controlled means are provided for moving the clutch shaft 118 to connect the table to the hand or the power feed and means are also provided which may be utilized when desired to automatically disconnect the power feed at the end of the table travel in either direction. To this end the clutch shaft 118 is secured to move with a bar 176 by means of a connecting link 178 which has at one end a collar 180 securely clamped to the bar 176 and at the other end embraces the clutch member 130 on the clutch shaft. A compression spring 181 surrounding the bar 176 and inserted between a shoulder 182 on the bar and a fixed portion of the machine frame tends to force the bar and the clutch shaft 118 in a direction to disconnect the power feed, and connect the hand feed mechanism. The clutch shaft may be moved against the pressure of the spring 181 to connect the power feed for the table by means of a hand lever 184 which is pivotally mounted at 186 on the frame of the machine to move transversely in the direction of the table feed and is connected at its lower end with the bar 176 by means of a pin and slot connection indicated at 188. The upper end or handle 190 of the lever 184 takes the form of a lever which is pivoted at 192 on the lever 184 to move towards and away from the front of the machine and extends through a T-shaped slot 194 on a bracket 195 secured to the machine frame. Normally while the power feed is disconnected, the hand lever 184 is positioned so that the handle 190 occupies the narrow end of the T-slot 194. In order to connect the power feed, the handle 190 is moved towards the left as viewed from the front of the machine causing the clutch shaft to be moved to the right to engage the power feed, and is held in position against pressure of the spring 181 by moving the handle about its pivot 192 into one of the arms 196 or 198 of the T-slot. A detent arrangement indicated at 199 is provided at the lower end of the handle 190 to hold it yieldingly in its adjusted position whether in the central position of the T-slot or forward or back in one of the arms.

The power feed may be automatically thrown out of operation at the end of the travel of the table in either direction by mechanism cooperating with the hand lever 184 which acts to dislodge the handle 190 of the hand lever 184 from the arm 196 of the T-slot, thus permitting the clutch shaft to move to the left under the pressure of its spring 181 to disconnect the power feed. This mechanism comprises a bar 202 slidably mounted in the bracket 200 to move across the arm 196 of the T-slot and is connected by means of the adjustable contact points 206 with the automatic control reversing lever 98. A cam recess 210 is cut in the bar 202 which for the normal center position of the reversing lever 98 during the travel of the table registers with the arm or recess 196 of the T-shaped slot to permit the insertion of the handle 190 into this slot. When the table reaches the end of its travel, the movement of the reversing lever 98 and the bar 202 with the cam recess 210 in either direction will cause the handle 190 to be ejected from the slot, and disconnect the power feed.

The work carried on the work supporting carriage is rotated during the grinding operation from the headstock at one of several speeds by means of a pulley 212 mounted on the headstock spindle which is connected by a belt 214 to the headstock drum 216 on the shaft 218 which is in turn connected with the change speed gearing in the gear box 42.

Several features of the present invention are directed to the provision of a simplified and improved cross feed mechanism for feeding the grinding wheel towards the work automatically or by hand as the grinding operation progresses. The cross feed mechanism comprises a hand wheel for moving the wheel spindle carriage forward or back by hand and a power feed for advancing the wheel spindle carriage in timed relation to the progress of the grinding operation on the work. With classes of work where the table is reciprocating the wheel spindle carriage is advanced slightly by the operation of the reversing mechanism at each end of the travel of the table. However, where the table is stationary, the rate of the power cross feed must be determined by some other standard, as for instance, by the rate of rotation of the work. The rate of rotation, however, varies widely in accordance with the setting of the change speed gearing for the headstock drive and one feature of the present invention consists in the provision of means for actuating the wheel spindle carriage cross feed from the headstock drive in timed relation to the rotation of the work and entirely independently of any variations in the setting of the change speed gearing which determines the rate of rotation of the work. Another feature of the invention in connection with the cross feed consists of mechanism mounted on a stationary and easily accessible portion of the machine for regulating the rate of the power cross feed in accordance with the nature of the work being operated upon. Other features consist in the provision of a simplified and improved control for throwing the hand and power feeds into and out of operation, and a caliper adjustment for setting the cross feed to turn the work down to size, which can be manipulated by the operator with a minimum of time and effort.

The mechanism for moving the grinding wheel towards and away from the work comprises a feed screw 220 (see Fig. 2) which extends toward the rear of the machine frame and engages with an internal thread in the bracket 224 on the wheel spindle carriage 21. On the forward end of the feed screw is secured a gear 226 which meshes with a pinion 228 formed on one end of a rotatable shaft 230 which also carries the hub of a spider 232 which is keyed to turn with the shaft. A hand wheel 234 is loosely mounted on the shaft 230 in front of the spider 232 and is normally connected to rotate therewith by means of the vernier adjustment mechanism shortly to be described.

The automatic cross feed mechanism for rotating the spider 232 to advance the wheel spindle carriage in the present construction comprises an internal ratchet and pawl construction which has important advantages over prior constructions in securing a more compact and efficient arrangement of the parts, a wider range in the rate of feed, and finally in making possible the use of the multiple stops as hereinafter described.

Figure 12:
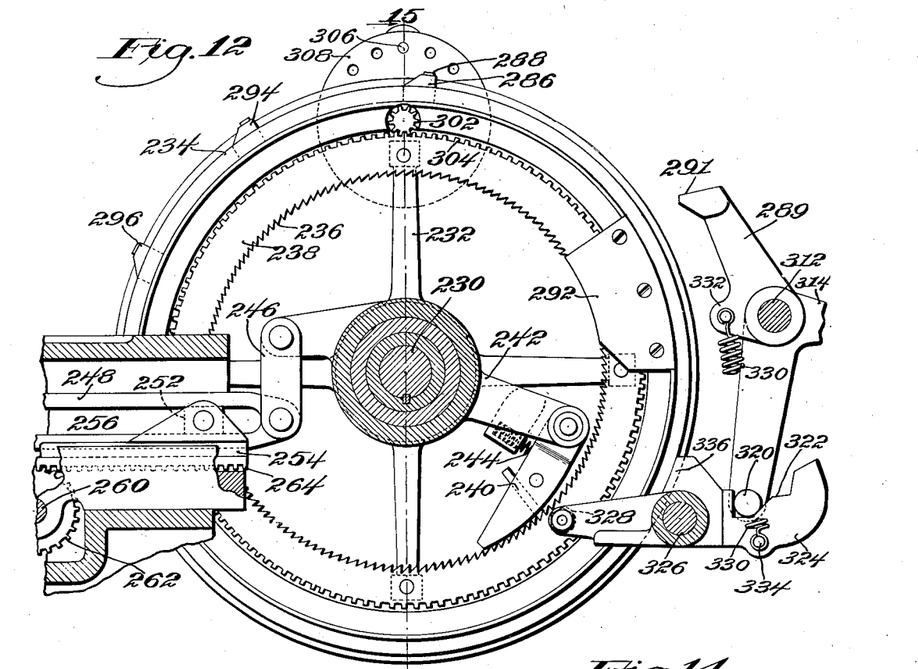
Fig. 12 is a detail sectional view of the cross feed control mechanism taken on the line 12—12 of Fig. 15.
Figure 15:
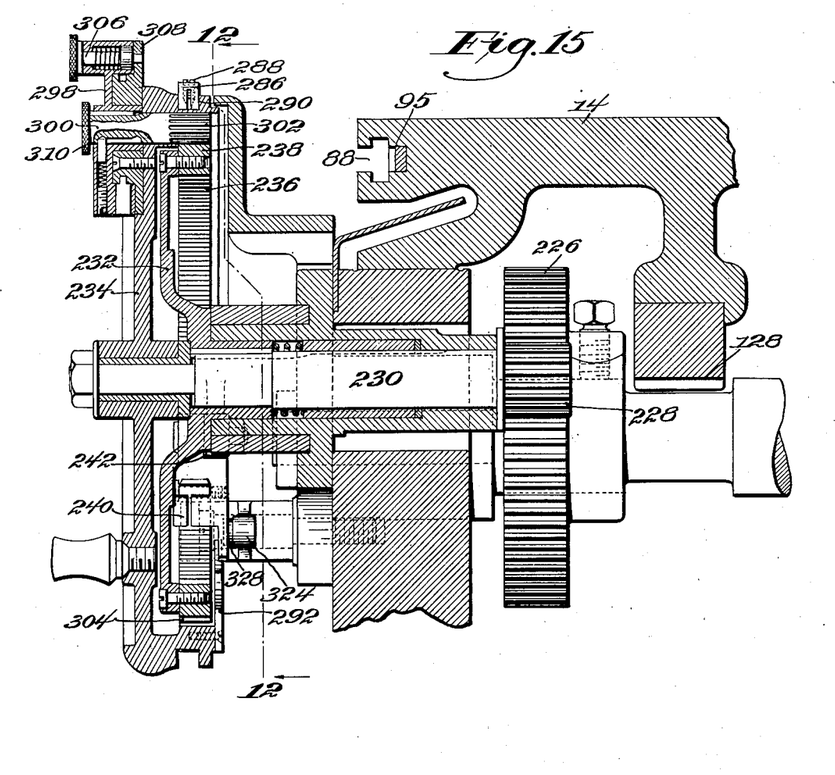
Fig. 15 is a sectional view in right elevation of the cross feed control mechanism, taken on the line 15—15 of Fig. 12.

This construction comprises an internal ratchet 236 formed on the ring 238 supported by the spider and a pawl 240 which is mounted on one end of a pawl lever 242 and is held yieldingly in engagement with the ratchet by means of a spring 244. The pawl lever 242 is loosely pivoted concentrically with the spider 232 and the hand wheel 234 and at its free end is connected by means of a link 246 to an actuating lever 248. This is in turn connected at its opposite end with a vertical bar 250 which is given a constant throw of reciprocating movement to actuate the power feed.

Figure 13:
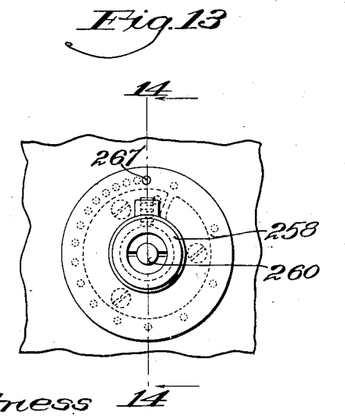
Fig. 13 is a detail view of the hand adjustment for the power cross feed mechanism.
Figure 14:
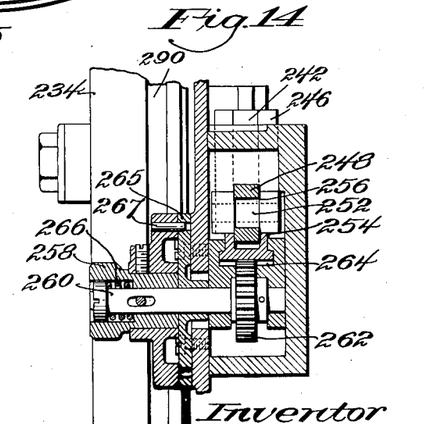
Fig. 14 is a sectional view in right elevation taken on the line 14—14 of Fig. 13.

In order to facilitate the adjustment of the rate of the power feed for the wheel spindle carriage in accordance with the nature of the work, the actuating lever 248 is provided with a fulcrum which is adjustable along the length of the lever to vary the throw given to the free end by the constant throw reciprocating movement of the vertical bar 250. The fulcrum comprises a block 252 which is pivotally mounted on an adjustable slide 254 and engages with a slot 256 formed in the lever. The position of the adjustable slide 254 which determines the effective throw of the lever 248 and the amount of the consequent rotation of the spider 232 for each feeding step is easily controlled by the operator from a knob or hand control 258 through connections which include a shaft 260 and a pinion 262 on the shaft which engages a rack 264 formed on the under side of the adjustable slide 254. The knob 258 is slidably mounted to turn with the shaft 260 by a pin and slot connection and is held seated against a plate 265 by means of a compression spring 266 which is inserted between a shoulder on the knob and a shoulder on the shaft. The plate 265 is provided with a series of holes arranged to register with a pin 267 in the knob 258 so that the slide 254 is locked in adjusted position.

During the reciprocating movement of the work table, the vertical bar 250 is given a reciprocating movement to feed the wheel spindle slide automatically by means of connections from the reversing lever 98 which comprise a cam roll 268 mounted on the vertical bar 250 and the horizontal sliding bar 102 which is secured to the lower end of the reversing lever and is provided with a cam surface 269 under which the cam roll rides. The cam groove 269 formed in the horizontal bar 102 is adapted, in the normal position of the reversing lever 98 and bar 102, to register with the cam roll 268 permitting the vertical bar 250 to maintain the relatively high position to which it is drawn by the action of a tension spring 270 stretched between the bar and a point on the machine frame. The movement of the reversing lever 98 to reverse the direction of the table at the end of its travel in each direction causes the horizontal bar to move so that the roll 268 riding on the cam groove 269 is forced downwardly to depress the bar 250 against the pressure of its spring 270 and advances the wheel spindle slide a single step. The horizontal bar 102 then returns to its original position as the reversing lever is centered by the action of the load and fire mechanism, thus permitting the vertical bar 250 to rise again under the influence of its spring 270. In this manner, a step by step feed is obtained with each reverse in the direction of the table drive.

A reciprocating movement is imparted to the vertical bar 250 to obtain a power feed for the wheel spindle slide when the work table is not in motion by means of connections with the headstock drive which comprise a spiral gear 272 mounted on the shaft 218 for the headstock drive. This gear meshes with a corresponding gear 274 which is keyed to turn with a shaft 276 and is secured against end movement by abutting portions of the machine frame. The shaft 276 is adapted to move lengthwise and is provided with an eccentric 278 which in the forward position of the shaft 276 engages with a cam roll 280 mounted on the vertical bar 250. A hand knob 282 is provided on the forward end of the shaft to permit the operator to move the shaft forward or back to connect or disconnect the power cross feed with the headstock drive. A spring pressed detent 282' which is adapted to engage with one of the two recesses 284 formed in the shaft tends to hold the shaft adjustably in position. With this arrangement of the parts, a power feed is obtained for the wheel spindle carriage which is in timed relation to the rotation of the work under all conditions and is entirely independent of the variations in the setting of the change speed gearing in the headstock drive.

In the operation of both the hand and the power cross feeds for the wheel spindle carriage, it is necessary to stop the feeding when the work has been brought down to size. In the present construction this is accomplished by means of stops mounted on the hand wheel 234 which is normally fixed to rotate with the spider 232. The stop for the hand feed comprises an expansible block 286 which is clamped adjustably in position by means of a tightening screw 288 in a groove 290 in the periphery of the hand wheel 234. The block 286 cooperates with a control lever 289 provided with an abutment 291 with which the block engages as hereinafter described. A corresponding stop is provided for the power feed and comprises a plate 292 mounted on the hand wheel to engage with and disconnect the pawl 240 from the ratchet 236 to disconnect the power feed.

Where the nature of the work requires the use of two or more grinding wheels of different diameters at the same time, it becomes necessary to true these wheels relatively to each other as well as to secure a true surface on each wheel. With the present construction, this may be done by the operator with a minimum of time and effort by the use of multiple stops which are most conveniently employed in connection with the hand feed. A number of stops such as those indicated at 294 and 296 similar to the stop 286 and corresponding to the additional number of wheels to be trued, are mounted in the groove 290 in the periphery of the hand wheel 234 and are spaced to permit the spindle wheel carriage to be fed towards the truing tool and stopped in the positions required to maintain the proper difference in the diameters of the respective grinding wheels.

In order to permit the stops 286 and 292 to be set readily and accurately to cause the work to be brought down to the exact size desired, a novel and improved vernier adjustment is provided for moving the hand wheel relatively to the spider to reset the stops after the work has been brought down approximately to size and the cross feed stopped with the stop 286 in engagement with the abutment 291. The vernier adjustment comprises a small wheel 298 keyed to a shaft 300 rotatably mounted on the hand wheel 234 and provided at its inner end with a pinion 302 which engages gear teeth 304 formed on the outer periphery of the ratchet ring 238. The wheel 298 is provided with a spring pressed knob 306 which is adapted to fit into any one of a series of holes formed on a corresponding stationary plate 308 on the hand wheel 234 so that during the normal operation of the machine, the hand wheel and the spider will be held in fixed relation to each other. When it is desired to reset the stops 286 and 292 to permit the wheel spindle carriage to advance a certain definite amount, the knob 306 is lifted and the vernier wheel 298 is turned through a number of degrees marked on a graduated scale which correspond to the number of thousandths of an inch which remains to be taken off the work when it is again secured by the knob 306. In order to permit the hand wheel to rotate freely with relation to the spider, the shaft 300 is adapted to be withdrawn to disengage the pinion 302 from the gear teeth 304, a knurled head 310 being provided on the shaft 300.

A simplified and improved controlling mechanism has been provided to enable the operator more readily to throw the hand and power feeds for the wheel spindle carriage into and out of operation with a minimum of time and effort. This mechanism comprises a three-position lever which may be set for the power feed or the hand feed or in an intermediate neutral position to permit the operator to run the wheel spindle carriage by hand rapidly into or out of operating position.

The control lever is illustrated at 289 pivotally mounted at 312 on the machine frame and is provided with a handle 314. The upper end of the lever forms an abutment 291 which is adapted in one position of the lever to engage with the stop 286 for the hand feed. The lower end of the lever is provided with a cam roll 320 which rides on a cam surface 322 formed on the throw-out lever 324 for the power feed. This lever is pivotally mounted at 326 on the machine frame and is provided at its other end with a cam roll 328 which is adapted to come in contact with and disconnect the pawl 240 for the power feed. The cam surface 322 is held in contact with the roll 320 by means of a tension spring 330 which is stretched between the shoulder 332 on the control lever 289 and a point 334 on the throw-out lever 324. The cam surface 322 takes the form of three steps so that when the upper end of the control lever 289 occupies its inmost position in the path of the stop for the hand feed, the throw-out lever 324 will be depressed to disengage the power feed. In the neutral or intermediate position of the control lever 289, the upper end of the lever will be withdrawn from the path of the stop 286 for the hand feed and the roll 320 will occupy the intermediate step in the cam surface 322 with the power feed still disconnected, the contour of the cam surface and the tension spring 330 acting in conjunction to hold the parts yieldingly in position. The hand wheel may now be rotated at will by the operator to move the wheel spindle carriage rapidly into or out of operating position. In the third position of the control lever 289, the upper end of the lever will be withdrawn to its fullest extent and the cam roll 320 at the lower end of the lever will ride in the lowest portion of the cam surface 322, thus disengaging the throw-out lever 324 from the pawl 240, and throwing in the power feed.

It is desirable during the operation of the power feed to provide a friction device to prevent overthrow of the cross feed mechanism in the step by step movement imparted by the pawl lever 242. In the present construction, this is accomplished by means of a brake arm 336 formed on the throw-out lever 324 which is drawn yieldingly into contact with the periphery of the hand wheel 234 by the tension spring 330 when the control lever 289 is positioned for the power feed.

In order to protect the wheel spindle carriage ways, the wheel spindle driving belt and other exposed parts from the water which is poured over the work during the grinding operation, a novel and improved system of guards is provided.

The guard for the rear end of the wheel spindle ways is indicated at 340 pivoted at 342 on the wheel spindle carriage and held yieldingly in contact with the rear end of the ways 28 by a tension spring.

Due to the small amount of space between the wheel spindle carriage and the work table and due to the irregular contour of the front end of the carriage ways which results from placing a water trough directly between the carriage and the work table, difficulty has been experienced in developing a guard for the front portion of the wheel spindle carriage which is sufficiently compact to fit into the limited space available and adaptable to the changing contour of the ways and the movable carriage. In order to eliminate these difficulties, the guard for the front portion of the wheel spindle carriage ways and the driving belt is made in two parts to conserve space and also to form a more adequate shield from the water. A guard 346 is pivotally mounted to swing about an axis 348 on the wheel spindle carriage and cooperates with a guard 350 mounted on a pivot 352 on the machine frame adjacent to the water trough. A tension spring 354 stretched between a point 356 on the guard 346 and a point on the machine frame, tends to hold the guard 346 yieldingly in contact with the guard 350 which bears against the front portion of the wheel spindle ways 28. A fixed guard 358 extends over the wheel spindle belt pulley to protect the belt from flying water, is fastened at its rear end by a screw 360 and rests at its front end on the axis 348 of the guard 346.

Certain features of the invention relating more particularly to the cross feed mechanism are not claimed herein but form the subject-matter of a divisional application Serial No. 418,214, filed January 3, 1930.

The invention having been thus described, what is claimed is:

1. A grinding machine having, in combination, a reciprocating table for supporting the work, a table drive, a reversing mechanism for controlling the reciprocation of the table from the table drive, mechanism for imparting a dwell in the movement of the table at each end of its reciprocating movement, and means for cushioning the movement of the table drive to move the table in an opposite direction.

2. A grinding machine having, in combination, a longitudinally movable table for supporting the work, driving mechanism for the table, a reversing mechanism for imparting a reciprocating movement to the table from the driving mechanism, means for providing a predetermined dwell at each end of the reciprocatory movement, and spring means for cushioning the application of the driving mechanism to drive the table in an opposite direction at the end of its travel in each direction.

3. A grinding machine having, in combination, a longitudinally movable table for supporting the work, driving mechanism for the table, a reversing mechanism for imparting a reciprocatory movement to the table from the driving mechanism, means for providing a dwell at each end of the reciprocatory movement of the table, and means for adjusting the amount of the dwell.

4. A grinding machine having, in combination, a longitudinally movable table for supporting the work, driving mechanism for the table, a reversing mechanism for imparting a reciprocatory movement to the table from the driving mechanism, means for providing a predetermined dwell at each end of the reciprocatory movement of the table, means for adjusting the amount of the dwell, and spring means for cushioning the application of the driving mechanism to drive the table in an opposite direction.

5. A grinding machine having, in combination, a movable table for supporting the work, driving mechanism for the table, a reversing mechanism for imparting a reciprocatory movement to the table from the driving mechanism, a shaft from which the table is driven, and a gear member driven from the reversing mechanism threaded for a limited travel on the shaft to secure a predetermined dwell at each end of the reciprocatory movement of the table.

6. A grinding machine having, in combination, a movable table for supporting the work, driving mechanism for the table, a reversing mechanism for imparting a reciprocatory movement to the table from the driving mechanism, a shaft from which the table is driven, a gear member driven from the reversing mechanism threaded for a limited travel on the shaft to secure a predetermined dwell at each end of the reciprocatory movement of the table, and spring bumpers to cushion the locking engagement of the gear member with the shaft at the end of its travel in each direction.

7. A grinding machine having, in combination, a movable table for supporting the work, driving mechanism for the table, a reversing mechanism for imparting a reciprocatory movement to the table from the driving mechanism, a shaft from which the table is driven, a gear member driven from the reversing mechanism threaded for a limited travel on the shaft to secure a predetermined dwell at each end of the reciprocatory movement of the table, and spring means for cushioning the locking engagement of the gear member with the shaft at the end of its travel in each direction.

8. A grinding machine having, in combination, a movable table for supporting the work, driving mechanism for the table, a reversing mechanism for imparting a reciprocatory movement to the table from the driving mechanism, a shaft from which the table is driven, a gear member driven from the reversing mechanism threaded for a limited travel on the shaft to secure a predetermined dwell at each end of the reciprocatory movement of the table, spring pressed plungers for cushioning the locking engagement of the gear member with the shaft at the end of its travel in each direction, and means for adjusting the relative positions of the plungers to adjust the amount of the dwell.

9. A grinding machine having, in combination, a longitudinally movable reciprocating work support, a power drive for the work support, a clutch connecting the table with its driving mechanism, a control lever for the clutch, spring means for holding the clutch and control lever in open position, a catch for holding the clutch and control lever in operative position against the pressure of the spring, and means acting automatically at the end of the table travel in either direction to release the control lever to disconnect the table from the power drive.

10. A grinding machine having, in combination, a longitudinally movable table for supporting the work, power driving mechanism for the table, a reversing mechanism for imparting a reciprocating movement to the table from the driving mechanism, a lever for disconnecting the table from its driving mechanism, and means actuated by the reversing mechanism and acting upon the lever to disconnect the table from its driving mechanism at the end of the table travel in either direction.

11. A grinding machine having, in combination, a longitudinally movable table for supporting the work, power driving mechanism for the table, a reversing mechanism for imparting a reciprocating movement to the table from the driving mechanism, a manually operated driving mechanism for the table, clutching devices for alternatively connecting the table to the hand and power drives, and means actuated by the reversing mechanism at the end of the table travel in either direction for shifting the clutching devices to disconnect the table from the power drive and connect it with the hand drive.

12. A grinding machine having, in combination, a longitudinally movable work table, driving mechanism for the table, a reversing mechanism for imparting a reciprocating movement to the table from the driving mechanism, and a drag mechanism adapted to provide frictional resistance to the movement of the table.

13. A grinding machine having, in combination, a longitudinally movable work table, driving connections for the table comprising a worm and worm gear, and a drag mechanism acting upon the worm.

14. A grinding machine having, in combination, a longitudinally movable work table, driving connections for the table comprising a worm and worm gear, and a drag mechanism to prevent overrunning of the driving mechanism.

15. A grinding machine having, in combination, a longitudinally movable work table, a power drive for the table, a reversing mechanism for imparting a reciprocating movement to the table from the power drive, manually operated means for driving the table, driving connections for the table comprising a worm and worm gear, clutching devices for connecting the worm alternatively to the hand feed and to the table drive, and a drag mechanism acting upon the worm.

16. A grinding machine having, in combination, a longitudinally movable work table, a power drive for the table, a reversing mechanism for imparting a reciprocating movement to the table from the power drive, manually operated means for driving the table, driving connections for the table comprising a worm and worm gear, and clutching devices for connecting the worm alternatively to the hand feed and to the table drive.

17. A grinding machine having, in combination, a longitudinally movable work table, a power drive for the table, a reversing mechanism for imparting a reciprocating movement to the table from the power drive, and a shock absorber mechanism situated between the table and the reversing mechanism adapted to provide a positive connection between the driving and driven members during the feeding of the table and to yield temporarily under the shock of starting and stopping.

18. A grinding machine having, in combination, a longitudinally movable work table, a power drive for the table, a reversing mechanism for imparting a reciprocating movement to the table from the power drive, and a shock absorber mechanism situated between the table and the reversing mechanism comprising a gear, a hub on which the gear is loosely mounted, and a series of spring pressed rollers inserted in cam faced apertures between the gear and the hub to permit a temporary yield between these parts under the shock of starting and stopping.

19. A grinding machine having, in combination, a longitudinally movable work table, a power drive for the table, a reversing mechanism for imparting a reciprocating movement to the table from the power drive, driving connections for the table comprising a worm and worm gear, a drag mechanism acting upon the worm, and a shock absorber mechanism for connecting the worm gear to the table adapted to provide a positive connection during the feeding of the table and to yield temporarily under the shock of starting and stopping.

20. A grinding machine having, in combination, a longitudinally movable table for supporting the work, driving mechanism for the table, a reversing mechanism for imparting a reciprocatory movement to the table from the driving mechanism, a worm gear through which movement is imparted to the table from the reversing mechanism, means for providing a predetermined dwell at each end of the reciprocatory movement of the table, and spring means for cushioning the application of the driving mechanism to drive the table in an opposite direction.

21. A grinding machine having, in combination, a longitudinally movable reciprocating work support, a power drive for the work support, mechanism including a reversing lever for imparting a reciprocating movement to the table from the driving mechanism, a clutch connecting the table with the driving mechanism, a control lever for the clutch, spring means for holding the clutch and control lever in open position, a catch for holding the clutch and control lever in operating position against the pressure of the spring, and cam means controlled by the reversing lever for automatically releasing the control lever at the end of the table travel in either direction to disconnect the table from the power drive.

22. A grinding machine having, in combination, a longitudinally movable table for supporting the work, power driving mechanism for the table, mechanism including a reversing lever for imparting a reciprocating movement to the table from the driving mechanism, a clutch connecting the table with its driving mechanism, a control lever for the clutch, spring means for holding the clutch and control lever in open position, a catch for holding the clutch and control lever in operating position against the pressure of the spring, a member having cam surfaces acting on the control lever to release the lever from the catch to disconnect the table from the power drive, and adjustable connections from the said member to the reversing lever for actuating the said member to release the control lever and the clutch upon movement of the reversing lever at the end of the table travel in either direction.

23. A grinding machine having, in combination, a longitudinally movable table for supporting the work, power driving mechanism for the table, mechanism including a reversing lever for imparting a reciprocating movement to the table from the driving mechanism, a lever for disconnecting the table from the driving mechanism, a member having cam surfaces movable to actuate the said lever to disconnect the table, and adjustable contact points on said member to engage with the reversing lever to disconnect the table from its driving mechanism upon movement of the reversing lever at the end of the table travel in either direction.

24. A grinding machine having, in combination, a longitudinally movable work table, driving mechanism for the table, a reversing mechanism for imparting a reciprocating movement to the table from the driving mechanism, and a drag mechanism acting on the table driving mechanism between the table and the reversing mechanism to provide a frictional resistance to the movement of the table.

In testimony whereof I have signed my name to this specification.

MAXWELL I. MATHEWSON.